(12) United States Patent
Szordykowski

(10) Patent No.: US 10,829,172 B2
(45) Date of Patent: Nov. 10, 2020

(54) BICYCLE STAND AND A METHOD OF ASSEMBLING A BICYCLE

(71) Applicant: Karl Szordykowski, Woodstock (CA)

(72) Inventor: Karl Szordykowski, Woodstock (CA)

(73) Assignee: Lime Tree Assembly Inc., Woodstock (CA)

( * ) Notice: Subject to any disclaimer, the term of this patent is extended or adjusted under 35 U.S.C. 154(b) by 75 days.

(21) Appl. No.: 15/938,098

(22) Filed: Mar. 28, 2018

(65) Prior Publication Data

US 2019/0300081 A1 Oct. 3, 2019

(51) Int. Cl.
*B62H 3/12* (2006.01)
*B23P 19/04* (2006.01)
*B23P 6/00* (2006.01)

(52) U.S. Cl.
CPC .................. *B62H 3/12* (2013.01); *B23P 6/00* (2013.01); *B23P 19/04* (2013.01)

(58) Field of Classification Search
CPC ... B62H 3/12; B62H 3/00; B23P 19/04; B23P 6/00; B25H 1/0014; F16M 11/32; G03B 17/561
See application file for complete search history.

(56) References Cited

U.S. PATENT DOCUMENTS

| 594,627 | A | * | 11/1897 | Hewlett | B25H 1/0014 211/22 |
| 3,739,609 | A | | 6/1973 | Kaufmann | |
| 5,320,227 | A | * | 6/1994 | Minoura | B25H 1/0014 211/22 |
| 5,417,629 | A | | 5/1995 | Phipps | |
| 5,498,015 | A | | 3/1996 | Trout | |
| 5,765,821 | A | | 6/1998 | Janisse | |
| 5,772,048 | A | | 6/1998 | Sopcisak | |

(Continued)

FOREIGN PATENT DOCUMENTS

| DE | 9315504 | 2/1994 |
| DE | 19739268 | 8/1998 |

OTHER PUBLICATIONS

Office Action; CA Patent Application No. 2,999,586, dated Jun. 15, 2018.
Team Issue Repair Stand: PRS-22.2, Park Tool, https://www.parktool.com/product/team-issue-repair-stand-prs-22-2?category=Portable, retrieved Mar. 24, 2018.
Home Mechanic Repair Stand: PCS-9, Part Tool, https://www.parktool.com/product/home-mechanic-repair-stand-pcs-9?category=Portable.

(Continued)

*Primary Examiner* — Lee A Holly
(74) *Attorney, Agent, or Firm* — Ridout and Maybee LLP

(57) ABSTRACT

A bicycle stand for supporting a bicycle or bicycle frame during assembly or repair, and a method of assembling a bicycle are provided. In one embodiment, the bicycle stand comprises a base for contact with a ground surface, and a post extending substantially vertical from the base and being supported by the base. The post includes a cylindrical receiving portion located at an upper end thereof for engaging a seat tube of a bicycle frame while the bicycle is in an upside-down or inverted position. The cylindrical receiving portion has a diameter of greater than 0.5 inches and less than 0.75 inches. A seat adapted for supporting the bicycle frame is located below the cylindrical receiving portion. The seat is positioned between 30 inches and 60 inches above the ground surface. The bicycle can be freely rotated about a central axis of the post while being supported by the bicycle stand in the upside-down or inverted position.

22 Claims, 10 Drawing Sheets

(56) References Cited

U.S. PATENT DOCUMENTS

| | | | |
|---|---|---|---|
| 6,164,843 A | 12/2000 | Battocchio | |
| 6,257,419 B1 | 7/2001 | Kamysiak | |
| 6,702,482 B2 | 3/2004 | Sherwin | |
| 8,794,650 B2 | 8/2014 | Williams | |
| 2008/0272264 A1 | 6/2008 | Carlson et al. | |
| 2011/0257848 A1* | 10/2011 | Shirai | B62K 19/36 |
| | | | 701/49 |
| 2012/0007298 A1* | 1/2012 | Proietti | B25H 1/0014 |
| | | | 269/59 |
| 2015/0346589 A1 | 12/2015 | Dering et al. | |
| 2016/0059916 A1* | 3/2016 | Woelfling | B62H 3/00 |
| | | | 224/567 |

OTHER PUBLICATIONS

Team Issue Repair Stand: PRS-25, Park Tool, https://www.parktool.com/product/team-issue-repair-stand-prs-25?category=Portable.
Home Mechanic Repair Stand: PCS-10, Part Tool, https://www.parktool.com/product/home-mechanic-repair-stand-pcs-10?category=Portable, retrieved Mar. 24, 2018.
Deluxe Home Mechanic Repair Stand: PCS-4-1, Park Tool, https://www.parktool.com/product/deluxe-home-mechanic-repair-stand-pcs-4-1?category=Portable, retrieved Mar. 24, 2018.
Deluxe Home Mechanic Repair Stand: PCS-4-2, Park Tool, https://www.parktool.com/product/deluxe-home-mechanic-repair-stand-pcs-4-2?category=Portable, retrieved Mar. 24, 2018.

\* cited by examiner

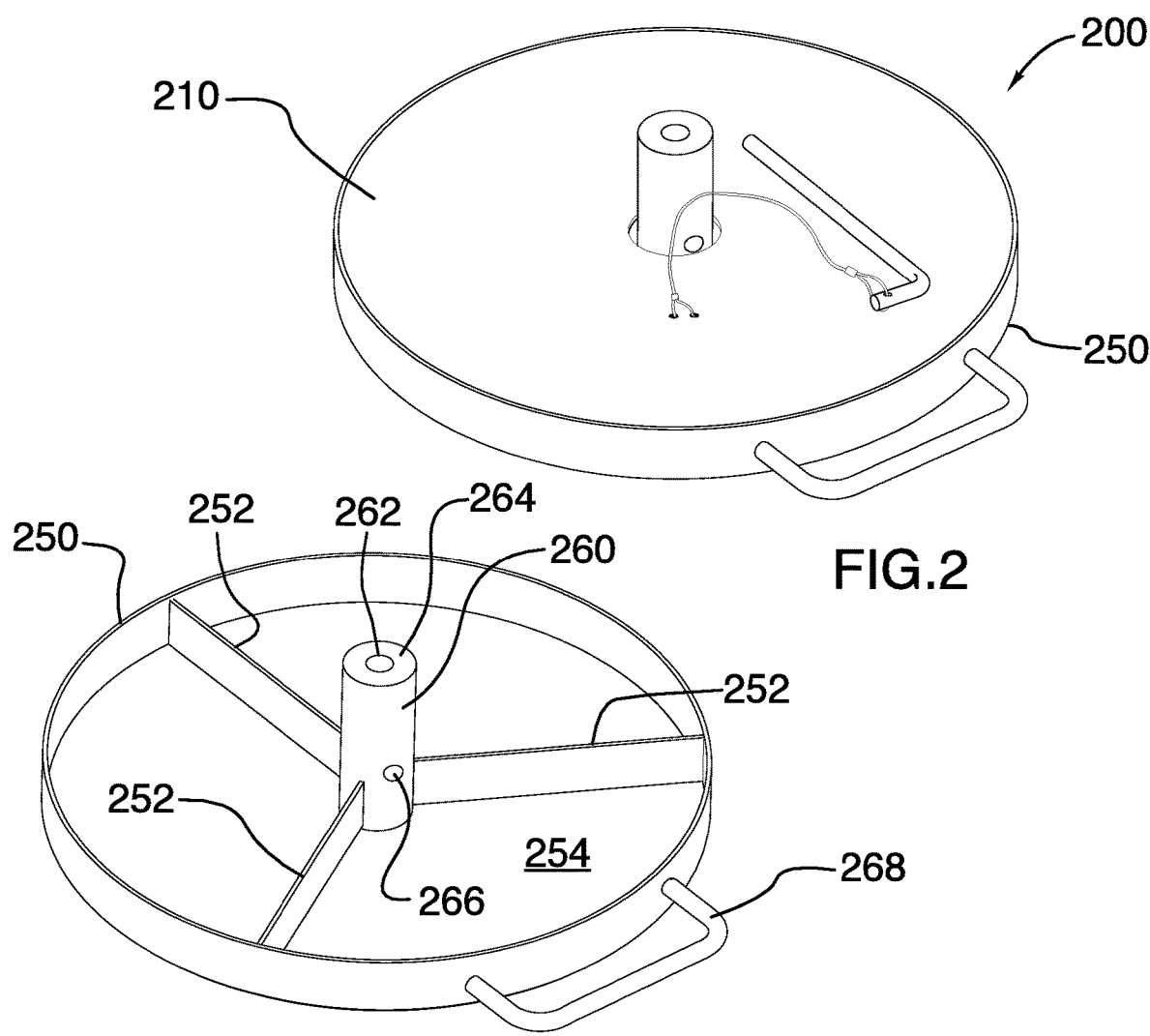
FIG.2
FIG.3
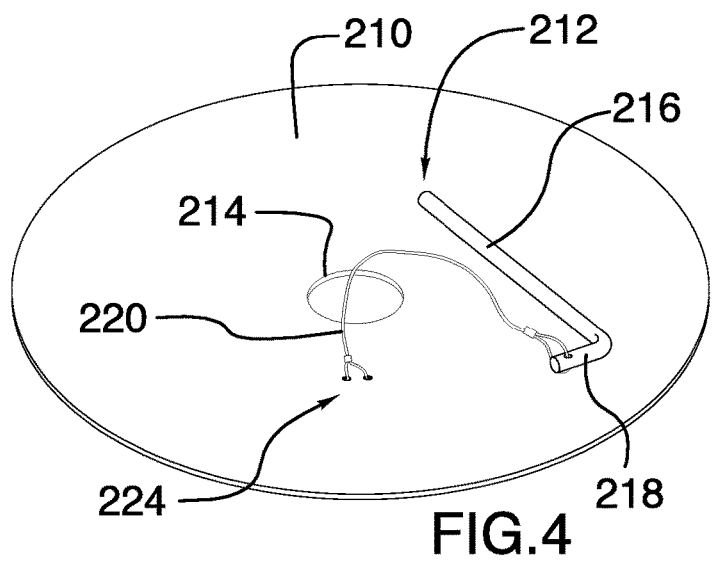
FIG.4

BICYCLE STAND AND A METHOD OF ASSEMBLING A BICYCLE

TECHNICAL FIELD

The present disclosure relates generally to a bicycle stand, and more particularly, to a bicycle stand for supporting a bicycle or bicycle frame during assembly or repair, and a method of assembling a bicycle.

BACKGROUND

Bicycle stands for displaying bicycles, performing bicycle maintenance, or parking a bicycle are known. Bicycle stands for the assembly or repair of a bicycle typically use one or more articled arms to grip the bicycle frame, typically by the top bar and optionally one of the wheels of the bicycle. Even with the use of existing bicycle stands, bicycle assembly and repair remains a time-consuming and labour-intensive process. There is a need for an improved bicycle stand which facilitates bicycle assembly and/or repair.

SUMMARY

The present disclosure provides a bicycle stand for supporting a bicycle or bicycle frame during assembly or repair, and a method of assembling a bicycle. The bicycle stand of the present disclosure can securely support a bicycle and is collapsible, allowing the stand to be very transportable. The bicycle stand is designed to support the entire weight of a bicycle and hold the bicycle (or a frame) in an upside-down or inverted position at a convenient height, allowing the assembly, maintenance or repair of the bicycle in the upside-down or inverted position in which at least some parts of the bicycle may be more readily accessible to an assembler or repairer. In addition, the bicycle stand allows the bicycle to be rotated or spun while being held by the stand, allowing an assembler to access parts of the bicycle that were previously inaccessible from an assembler's position without having to make complicated adjustment to articled arms or requiring the assembler to move. This increases the speed of assembly, maintenance and repair and reduces the labour-intensive nature, reducing the fatigue and risk of injury to human assembler and better enabling automation while ensuring a high quality in bicycle assembly, maintenance and repair work.

A method of assembling a bicycle when supported in the upside-down or inverted position using the bicycle stand of the present disclosure is also provided. The method is believed to be more efficient than known approaches. Furthermore, known assembly stands are unable to hold or support a bicycle in the upside-down or inverted position, nor has this capability even been suggested. Indeed, part of the present invention exists in the inventor's realization that assembling a bicycle when supported in the upside-down or inverted position may be advantageous in that certain parts of the bicycle may be more accessible and that, when supported by an annular seat of a substantially vertical post, the bicycle can be freely rotated upon a central axis of the post while being supported by the bicycle stand in the upside-down or inverted position, thereby allowing the assembler to access the other side of the bicycle when necessary or desirable while an assembler remains stationary. This obviates the need for the assembler to move, thereby facilitating simpler, more efficient and faster assembly. Known assembly stands are unable to hold or support a bicycle in the upside-down or inverted position because such stands use articulating arms to grip the top bar, and holding the bicycle in this position would result in a top heavy and unstable load.

In accordance with one aspect of the present disclosure, there is provided a bicycle stand. The bicycle stand comprises a base for contact with a ground surface, and a post extending substantially vertical from the base and being supported by the base. The post includes a cylindrical receiving portion located at an upper end thereof for engaging a seat tube of a bicycle frame while the bicycle is in an upside-down or inverted position. The cylindrical receiving portion has a diameter of greater than 0.5 inches and less than 0.75 inches. A seat adapted for supporting the bicycle frame is located below the cylindrical receiving portion. The seat is positioned between 30 inches and 60 inches above the ground surface, wherein the bicycle can be freely rotated about a central axis of the post while being supported by the bicycle stand in the upside-down or inverted position.

In accordance with some embodiments, the seat is provided by a flange or collar extending radially outward from the post.

In accordance with some embodiments, the post comprises a first portion and a second portion, the first portion being the cylindrical receiving portion, the second portion being located below the cylindrical receiving portion and having a larger cross-sectional area, wherein the seat is provided by a top of the second portion.

In accordance with some embodiments, the seat is provided by a clamp or collar releasably secured about an outer surface of the cylindrical receiving portion.

In accordance with some embodiments, the bicycle stand further comprises: a removable tool tray removably mounted to the post so that the tool tray is accessible by an assembler while the bicycle frame is received on the bicycle stand.

In accordance with some embodiments, the tool tray comprises a base having a rim extending around the periphery thereof, and a tubular hub at the centre of the base, wherein the tubular hub defines a central passage through which the cylindrical receiving portion of the post is received and a seat surrounding the central passage upon which the tool tray rests, wherein the seat of the post supports the tool tray via the seat of the tool tray.

In accordance with some embodiments, the post is telescoping to provide an adjustable length.

In accordance with some embodiments, the post is received in an outer tube, the post being movable within the outer tube, wherein the post comprises a lock mechanism for releasably securing the position of the post relative to the outer tube.

In accordance with some embodiments, the lock mechanism is a lock clamp or a set screw.

In accordance with some embodiments, the base comprises a pair of legs rotatably connected to a connecting member.

In accordance with some embodiments, the pair of legs are rotatably connected to the connecting member, wherein the bicycle stand further comprises a lock mechanism for releasably securing the position of the legs.

In accordance with some embodiments, the cylindrical receiving portion has a diameter of between 0.70 and 0.74 inches.

In accordance with some embodiments, the seat is positioned between 34 inches and 38 inches above the ground surface with which the base is in contact.

In accordance with some embodiments, the seat is positioned between 35 and 37 inches above the ground surface with which the base is in contact.

In accordance with another aspect of the present disclosure, there is provided a bicycle stand, comprising: a base for contacting a ground surface; holding means coupled to the base for holding a bicycle in an upside-down or inverted position; and rotating means coupled to the base for rotating the bicycle in the upside-down or inverted position while being held by the holding means.

In accordance with some embodiments, the bicycle stand further comprises: height adjusting means for adjusting a height at which the bicycle is held in the upside-down or inverted position.

In accordance with some embodiments, the holding means is adapted for engaging a seat tube of a frame of the bicycle.

In accordance with some embodiments, the holding means and rotating means provide a seat adapted for supporting the bicycle frame via the seat tube of the frame of the bicycle, wherein the height adjusting means cooperates with the holding means so that a height of the seat is moveable between 30 inches and 60 inches above the ground surface.

In accordance with a further aspect of the present disclosure, there is provided a kit for a bicycle stand, comprising: a base for contact with a ground surface; and a post to be supported by the base and extending substantially vertical from the base. The post includes: a cylindrical receiving portion located at a distal end thereof for engaging a seat tube of a bicycle frame while the bicycle is in an upside-down or inverted position, the cylindrical receiving portion having a diameter of greater than 0.5 inches and less than 0.75 inches; and a seat adapted for supporting the bicycle frame a distance from the distal end of the cylindrical receiving portion, wherein, when post is supported by the base and extending substantially vertical from the base, the seat is positioned between 30 inches and 60 inches above the ground surface, wherein the bicycle can be freely rotated about a central axis of the post while being supported by the bicycle stand in the upside-down or inverted position.

In accordance with some embodiments, the seat is provided by a flange or collar extending radially outward from the post.

In accordance with some embodiments, the post comprises two portions, a first of the two portions being the cylindrical receiving portion and a second of the two portions being located below the cylindrical receiving portion and having a larger cross-sectional area, wherein the seat is provided by an upper end of the second portion.

In accordance with some embodiments, the seat is provided by a clamp or collar releasably secured about an outer surface of the cylindrical receiving portion.

In accordance with some embodiments, the kit further comprises a removable tool tray for removably mounting to the post so that the tool tray is accessible by an assembler while the bicycle frame is received on the bicycle stand.

In accordance with some embodiments, the tool tray comprises a base having a rim extending around the periphery thereof, and a tubular hub at the centre of the base, wherein the tubular hub defines a central passage through which the cylindrical receiving portion of the post is received and a seat surrounding the central passage upon which the tool tray rests, wherein the seat of the post supports the tool tray via the seat of the tool tray.

In accordance with a further aspect of the present disclosure, there is provided a kit for a bicycle stand, comprising: a base for contacting a ground surface; holding means coupled to the base for holding a bicycle in an upside-down or inverted position; and rotating means coupled to the base for rotating the bicycle in the upside-down or inverted position while being held by the holding means.

In accordance with yet a further aspect of the present disclosure, there is provided a method of assembling a bicycle, comprising: providing a bicycle stand as described herein; positioning the bicycle frame in an upside-down position; positioning a seat tube of the bicycle frame on the cylindrical receiving portion of the bicycle stand; while the bicycle is received on the cylindrical receiving portion of the bicycle stand: installing and aligning a front wheel of the bicycle, installing pedals on a crank of the bicycle, aligning front brakes of the bicycle, installing and aligning a rear wheel of the bicycle, aligning rear brakes of the bicycle, adjusting a rear derailleur of the bicycle, adjusting a front derailleur of the bicycle, and inflating tires of the front wheel and rear wheel; removing the partially assembled bicycle from the bicycle stand; while the bicycle is on the ground surface: aligning handlebars of the bicycle with the bicycle frame, inserting a seat post into the opening of the seat tube, aligning the seat with the bicycle frame, and securing the seat post to the bicycle frame.

In accordance with yet a further aspect of the present disclosure, there is provided a method of assembling a bicycle, comprising: providing a bicycle stand as described herein; positioning the bicycle frame in an upside-down position; positioning a seat tube of the bicycle frame on the cylindrical receiving portion of the bicycle stand; performing a first set of assembly operations while the bicycle is received on the cylindrical receiving portion of the bicycle stand; removing the partially assembled bicycle from the bicycle stand; and performing a second set of assembly operations while the bicycle is on the ground surface.

Other aspects and features will be apparent to those skilled in the art having regard to the following description.

BRIEF DESCRIPTION OF THE DRAWINGS

FIG. 2 is a perspective view of a tool tray for the bicycle stand of FIG. 1 in a closed position.

FIG. 3 is a perspective view of the tool tray of FIG. 2 in an open position.

FIG. 4 is a perspective view of a cover for the tool tray of FIG. 2.

DETAILED DESCRIPTION OF EXAMPLE EMBODIMENTS

The bicycle stand of the present disclose comprises a base for contacting a ground (or floor) surface, holding means coupled to the base for holding a bicycle in an upside-down or inverted position, and rotating means coupled to the base for rotating the bicycle in the upside-down or inverted position while being held by the holding means. The bicycle stand may also comprise height adjusting means for adjusting a height at which the bicycle is held in the upside-down or inverted position. In some examples, the bicycle stand provides a seat adapted for supporting the bicycle frame via the seat tube of the frame of the bicycle. The height adjusting means cooperates with the holding means so that a height of the seat is moveable between 30 inches and 60 inches above the ground surface.

In some embodiments, the holding means is adapted for engaging a seat tube of a frame of the bicycle.

In some embodiments, the base comprises a support structure. The support structure may be a base or a leg assembly. In some embodiments, the holding means and rotating means are provided by a post having a seat. The post extends substantially vertical from the support structure. When the bicycle is received upon the post via the seat tube of the frame of the bicycle, a distal end of the post engages the interior of the seat tube and the bicycle rests upon the seat of the post, allowing the bicycle be freely rotated about the post.

Figure 1:
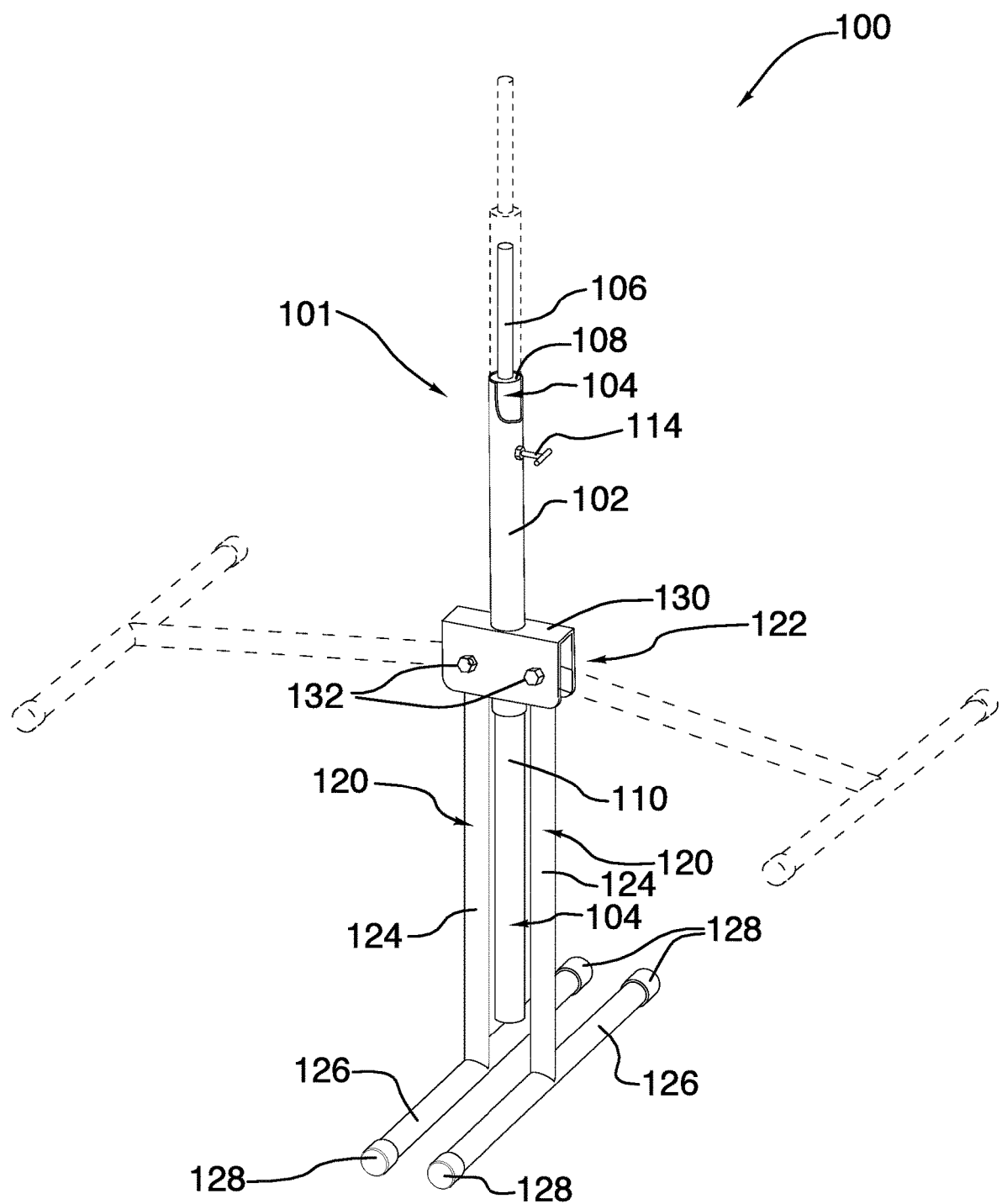
FIG. 1 is a perspective view of a bicycle stand in accordance with a first embodiment of the present disclosure with the bicycle stand in a collapsed position.

Referring to FIG. 1, a bicycle stand 100 in accordance with a first embodiment of the present disclosure will be described. The structural components of the bicycle stand 100 may be constructed primarily of a light-weight material such as aluminum, or a combination of aluminum and steel, to reduce the weight of the bicycle stand 100 while keeping the bicycle stand 100 strong and durable.

The bicycle stand 100 comprises a post 101 which is supported in a substantially vertical direction by a support structure for contact with a ground (or floor) surface. The post 101 extends substantially vertical from the support structure. For example, in some embodiments the post 101 extends in a direction less than 10 degrees from the vertical, more preferably less than 5 degrees from the vertical, more preferably less than 2 degrees from the vertical, more preferably 1 degree or less from the vertical.

The support structure in the shown embodiment of FIG. 1 comprises a pair of legs, each leg being represented individually by the reference 120. In the shown embodiment, the post 101 is telescoping. The post 101 includes an outer tube 102 and an inner post 104 movable within the outer tube 102. The inner post 104 is solid in the shown embodiment but may be a tube (e.g., hollow) in other embodiments provided the inner post 104 has a suitable combination of material selection and material thickness. The inner post 104 can be moved with respect to the outer tube 102. In the shown embodiment, the inner post 104 can be moved telescopically upwardly within the outer tube 102. The length of the post 101 can be adjusted by setting a telescoped length of the inner post 104 with respect to the outer tube 102 and engaging a lock mechanism 114 for releasably securing the position of the inner post 104 relative to the outer tube 102. In the shown embodiment, the lock mechanism 114 is a set screw (e.g., thumb screw) which can be tightened to releasably secure the position of the inner post 104 relative to the outer tube 102. In other embodiments, the lock mechanism 114 may be a lock clamp or other suitable mechanism.

A connecting member 130 is fixed to the outer tube 102 of the post 101 near a bottom end of the outer tube 102 by welding or the like. The outer tube 102 and connecting member 130 may be provided by a single structural component. The connecting member 130 is a generally U-shaped channel with an open end facing downwardly. In other embodiments, a pair of base plates may be used instead of the generally U-shaped channel.

The legs 120 each comprise a leg bar 124. The leg bars 124 are rotatably mounted to the connecting member 130 at different ends of the sides of the connecting member 130. In the shown example, the legs 120 are rotatably mounted to the connecting member 130 via fastener 132, such as a bolt, locking pin or the like, at a first end of the leg bar 124. A base bar 126 is fixedly connected to at a second end of each leg bar 124 so that each leg is generally T-shaped. Alternatively, in other embodiments the base bars 126 may be rotatably connected to the leg bars 124, for example via a hinge, allowing the base bars 126 to be collapsed when the bicycle stand 100 is not in use. The legs 120 may be easily expanded for use when the bicycle stand 100 is being set up after transportation or storage, and easily collapsed for transportation or storage after the bicycle stand 100 has been used.

Figure 7:
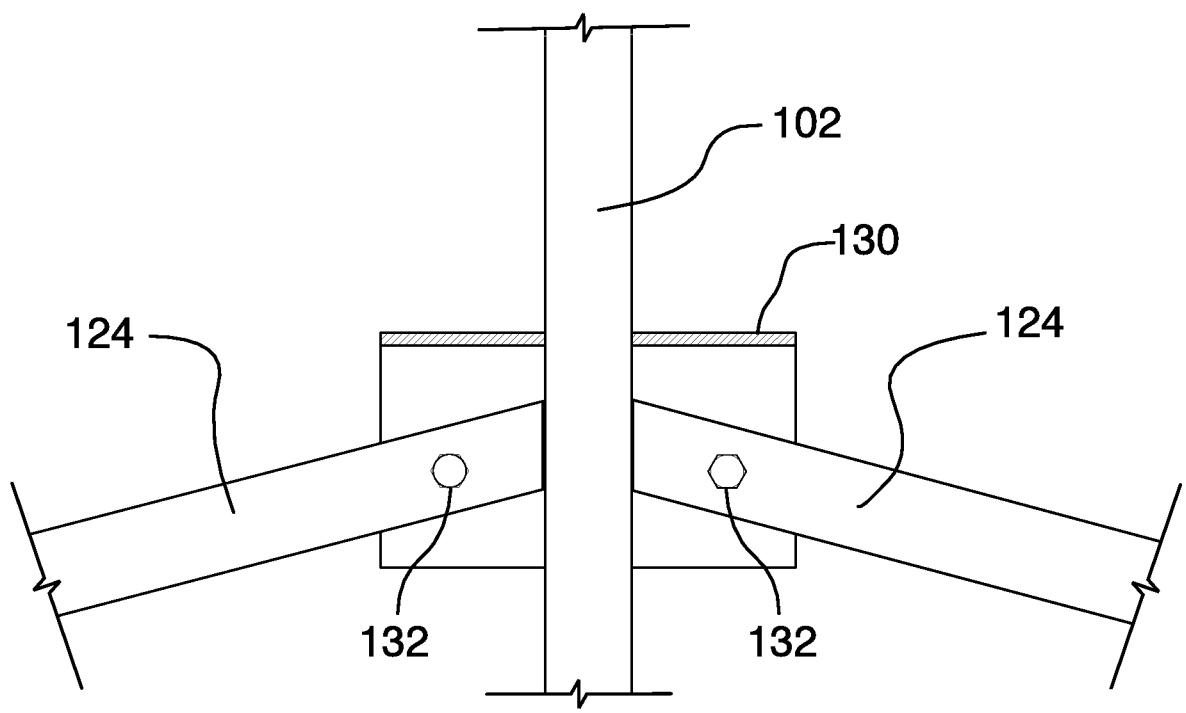
FIG. 7 is an enlarged view of a part of the bicycle stand of FIG. 1.

As shown in FIG. 7, the leg bars 124 is rotatable about the fastener 132, which defines an axis of rotation of each leg 120. The top of the leg bars 124 is tapered in the shown embodiment. The tapered top of the leg bars 124 provides a stop which the limits the range movement of the legs 120 when the bicycle stand 100 is in use by contacting the outer tube 102 when the legs 120 are fully expanded, preventing further rotation of the leg bars 124. In some examples, the top of the leg bars 124 is tapered to between 65 degrees and 80 degrees relative to the longitudinal axis of the leg bars 124 so that when the bicycle stand 100 is in use and the legs 120 are in an expanded (or unfolded) state, the legs 120 are positioned at an angle of between 10 and 25 degrees to the ground or floor, preferably at an angle of between 12 and 18 degrees, more preferably at an angle of approximately 15 degrees.

In some embodiments, the structural components of the bicycle stand 100 are made of aluminum with the possible exception of the outer tube 102 and/or connecting member 130. In such embodiments, the leg bars 124 may be tubular and hollow except for a top portion of the leg bars 124, which is substantially solid. This increases the strength and duration of the legs 120 and the bicycle stand 100, allowing the bicycle stand 100 to repeatedly support the entire weight of a bicycle (or frame), and allowing the bicycle stand 100 to be expanded and collapsed repeatedly without undue wear on the components of the bicycle stand 100. The solid top portion of the leg bars 124 may be 2 to 3 inches and may be formed by welding an aluminum plug in the top portion of an aluminum tube forming the leg bars 124 in some examples. In some examples, the total length of the leg bars 124 is between 20 to 24 inches whereas the outer diameter of the leg bars 124 is between 1.2 and 1.4 inches.

When the bicycle stand 100 is not in use, the legs 120 are generally parallel to the post 101 as shown in solid lines in FIG. 1. This is referred to as the collapsed (or folded) state of the bicycle stand 100. When the bicycle stand 100 is in use, the legs 120 are rotated to be transverse to the post 101 as shown by stippled lines in FIG. 1. This is referred to as the expanded (or unfolded) state of the bicycle stand 100. In the expanded state, the legs 120 are positioned at an angle of between 10 and 25 degrees to the ground or floor, preferably at an angle of between 12 and 18 degrees, more preferably at an angle of approximately 15 degrees. This position allows the bicycle stand 100 to stably and securely support the entire weight of a bicycle (or frame) in a balanced condition, with the legs 120 less than 12 inches above the floor.

In some embodiments, the bicycle stand 100 may comprise a lock mechanism 122 for releasably securing the position of the legs 120. For example, a tensioner may be provided by the connecting member 130. The tensioner may have two states: an enabled or "on" state (or position) in which the movement of the legs 120 is restricted and a disabled or "off" state (or position) in which the legs 120 may move freely. When the tensioner is enabled, the legs 120 will not move freely even under the weight of a bicycle mounted on the bicycle stand. When the tensioner is not enabled, the legs 120 may move freely. In some embodiments, stops or limiters may be provided by the connecting member 130, limiting the range of movement of the legs 120.

The base bars 126 include pads (also known as feet or grips) 128 at the respective ends thereof for reducing or preventing slippage. The pads 128 are made of a high friction rubber such as rigid synthetic resin or other suitable material, and grip the ground (or floor) surface when the bicycle stand 100 is in use, increasing the stability of the bicycle stand 100 and restricting lateral movement of the bicycle stand 100 when in use.

The inner post 104 includes a cylindrical receiving portion 106, also known as a dowel post, located at an upper, distal end thereof for engaging a seat tube of a bicycle frame. The cylindrical receiving portion 106 has a diameter of greater than 0.5 inches and less than 0.75 inches, preferably between 0.70 and 0.74 inches, more preferably between 0.72 and 0.73 inches in some embodiments. The present inventor has found that a diameter of between 0.70 and 0.74 inches more preferably between 0.72 and 0.73 inches, is suitable for use with a wide selection of commercial seat tubes, if not all, the diameter of which may vary between different bicycles. At a diameter of between 0.70 and 0.74 inches, more preferably between 0.72 and 0.73 inches, the diameter of the post 101 is small enough to be received relatively securely within a wide selection of commercial seat tubes while having enough clearance for a reduced friction spin of the bicycle about the post 10 and while holding the bicycle substantially vertical.

The top edge of the cylindrical receiving portion 106 may be rounded for safety and to provide easier mounting and removal of a bicycle. The inner post 104 also includes a seat 108 adapted for supporting the bicycle (or frame) via the seat tube of the bicycle frame. The seat 108 is located below the cylindrical receiving portion 106. The cylindrical receiving portion 106 has a length (height) of at least 2 inches relative to the seat 108. For example, the height of the cylindrical receiving portion 106 has a length (height) between 2 and 6 inches relative to the seat 108 inches in some embodiments, preferably 3 to 6 inches, and more preferably 4 to 6 inches. In some embodiments, the height of the outer tube 102 is between 12 and 16 inches and the height of the inner post 104 is between 40 and 54 inches, with the seat 108 located between 2 and 6 relative from the top, distal end of the inner post 104, preferably 3 to 6 inches, and more preferably 4 to 6 inches.

The seat 108 is positioned between 30 inches and 60 inches above the ground (or floor) surface when the bicycle stand 100 is in use. For example, in some embodiments the seat 108 is positioned between 34 inches and 48 inches above the ground (or floor) surface when the bicycle stand 100 is in use, and in some embodiments the seat 108 is positioned between approximately 36 and approximately 60 inches above the ground surface when the bicycle stand 100 is in use. Thus, a bicycle is elevated off the ground when mounted on the bicycle stand 100 so that bicycle assembly, repair or maintenance can be easily performed thereon. The height to the post 101, and therefore the seat 108, can be adjusted as described herein, allowing greater flexibility in the configuration of the bicycle stand 100, thereby accommodating the particular assembler using the bicycle stand 100 and the particular assembly environment.

Figures 8A, 8B, 8C:
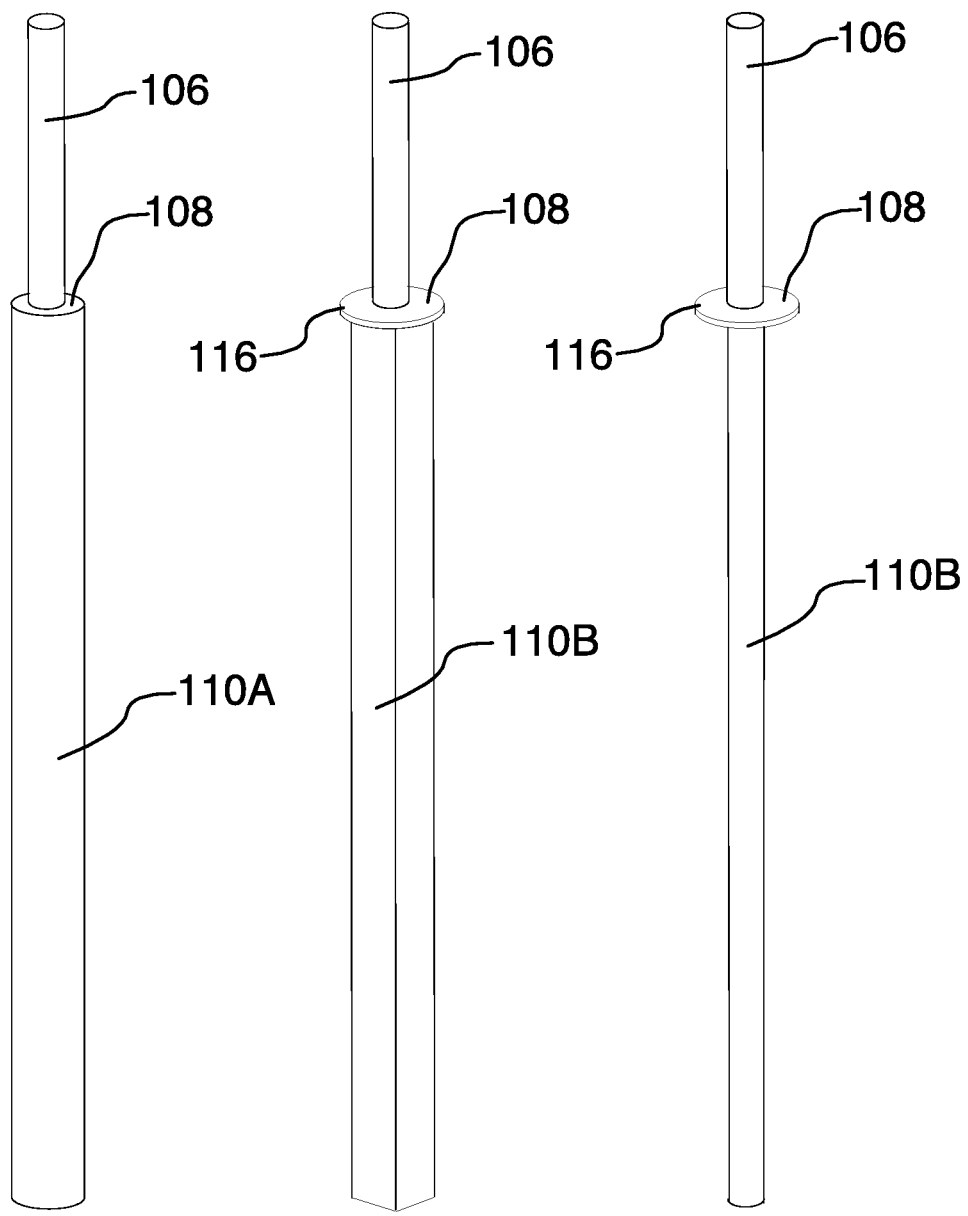
FIG. 8A shows an inner post in accordance with the first embodiment of the present disclosure.
FIG. 8B shows an inner post in accordance with a second embodiment of the present disclosure.
FIG. 8C shows an inner post in accordance with a further embodiment of the present disclosure.

The post 104 comprises two portions: a first, upper portion and a second, lower portion. The first portion is a cylindrical receiving portion 106 and the second portion 110 is located below the cylindrical receiving portion 106. FIG. 8A shows the inner post in accordance with a first embodiment of the present disclosure. In FIG. 8A, the second portion 110A has a larger diameter than the upper, cylindrical receiving portion 106. This increases the strength of the post 104. A top surface of the second portion 110A forms an annulus or ring which provides the seat 108 upon which the seat tube of the bicycle frame is supported. In some examples, the annulus has an outer diameter of between 1.5 and 1.75 inches and an inner diameter of between 0.5 and 0.75 inches. In some embodiments, the outer diameter is 1.75 and the inner diameter is 0.75 inches.

FIG. 8B shows an inner post in accordance with a second embodiment of the present disclosure. The post differs from that of FIG. 8A in that the second portion 110B has a square cross-sectional area. However, the second portion 110B has a larger diameter than the upper, cylindrical receiving portion 106 as in FIG. 8A. The embodiment of FIG. 8B can be used with an outer tube having a matching square cross-sectional area. The seat 108 is provided by a flange (or collar 116) extending radially outward from the inner post between the upper, cylindrical receiving portion 106 and the lower, square, larger diameter portion. A top surface of the flange 116 forms an annulus or ring which provides the seat 108 upon which the seat tube of the bicycle frame is supported.

FIG. 8C shows an inner post in accordance with a further embodiment of the present disclosure. In FIG. 8C, the second portion 110C has the same diameter as the upper, cylindrical receiving portion 106. The seat 108 is provided by a flange or collar 116 extending radially outward from the inner post.

FIGS. 2 to 4 show a tool tray 200 for the bicycle stand 100. FIG. 2 shows the tool tray 200 in a closed position with the cover 210 installed (or mounted) on the base 254. FIG. 3 shows the tool tray 200 in an open position with the cover removed. FIG. 4 shows the cover for the tool tray 200 in isolation. The tool tray 200 comprises a base 254 with a rim (or lip) 250 extending around the periphery thereof. In the shown embodiment, the tool tray 200 including the base 254 and cover 210 are circular. In other embodiments, the tool tray 200 may be rectangular, square or otherwise suitable shape. A tubular hub 260 is located at the centre of the tool tray 200. The tubular hub 260 defines a central passage 262 through which the cylindrical receiving portion 106 of the inner post 104 can be received, and a seat 264 defined by annulus or ring surrounding the central passage 262. The tool tray 200 rests upon the seat 264 when installed on the post 101. The central passage 262 has a diameter corresponding to the outer diameter of the cylindrical receiving portion 106. In some embodiments, the diameter of the central passage 262 is slightly larger than the outer diameter of the cylindrical receiving portion 106, for example, a few hundredths or thousandths of an inch larger, to allow clearance. The tool tray 200 is rotatably mounted so that the tool tray 200 can be freely rotated about the central axis of the post 101. This allows a necessary or desirable tool located in the tool tray 200 that was previously inaccessible from an assembler's position to be accessed by the assembler without requiring the assembler to move.

The seat 108 of the post 101 supports the tool tray 200 via the seat 264 when mounted on the bicycle stand 100. A number of dividers or separators 252 are provided to organize tools upon the tool tray 200. In the shown embodiment, the tool tray 200 comprises three, equally spaced apart dividers 252 to create three compartments or storage areas. A different number or configuration of dividers may be provided in other embodiments. The hub 260 also defines a through hole 266 just above the rim 250.

As shown in FIGS. 2 and 4, the cover 210 has a central passage 214 having a diameter corresponding to the outer diameter of the hub 260. In some embodiments, the diameter of the central passage 214 is slightly larger than the outer diameter of the hub 260, for example, a few hundredths or thousandths of an inch larger. The tool tray 200 also includes a lock pin for releasably securing the cover 210, for example, during transportation when the bicycle stand is not in use. In the shown embodiment, the lock pin 212 is generally L-shaped having a shaft 216 and a handle 218 at one end. The lock pin 212 is attached to the cover 212 by a cable (or wire) 220 in the shown embodiment for safekeeping. The cable 220 connects to the handle 218 of the lock pin 212 and an attachment point 224 on the cover 210 via suitable connection means. When the cover 210 is installed on the tool tray 200, it can be releasably secured by inserting the lock pin 212 through the through hole 266 in the hub 260.

The tool tray 200 may be easily installed (e.g., mounted) on the bicycle stand 100 when the bicycle stand 100 is to be used, and easily removed when the bicycle stand 100 is not to be used, allowing the bicycle stand 100 to be very transportable. The tool tray 200 may be pre-loaded with a selection of tools (not shown) that may be required during bicycle assembly. The tools may be secured within the tool tray 200 by the cover 210 when the tool tray 200 is in the closed position, for example, for easy transportation or storage. The tools may be located in designated compartment of the tool tray 200 based on tool type, bicycle type, an associated color (described below), or assembly stage (i.e., step or set of two or more steps). The tools in the tool tray 200 may be color coded for faster selection to speed up the bicycle assembly process. The tools may be color coded via the respective handle grip. For example, the entire handle grip may be color coded or a portion of the handle grip may be color coded, for example, a colored stripe may be presented in the form of colored tape, paint, or the like. In one embodiment, wrench and socket are colored as follows: black for 8 mm (used for gear adjustments); white for 9 mm (used for gear adjustments); blue for 10 mm (used for brake adjustments); red for 13 mm (used for handle bars and seat to frame bolts); yellow for 14 mm (used for seat adjustments and sometimes handlebars); green for 15 mm (used for installing wheel nuts and sometimes handlebars); black for 17 mm (used for wheel nuts on bicycle motocross (BMX) bicycles). In one embodiment, Allen key and socket Allen keys are colored as follows: blue for 4 mm (used for brake adjustments); red for 5 mm (used for brake levers and pad adjustments); green for 6 mm (used for handle bars and seats when needed); and black for 8 mm (used for kick stand adjustments).

Figure 5:
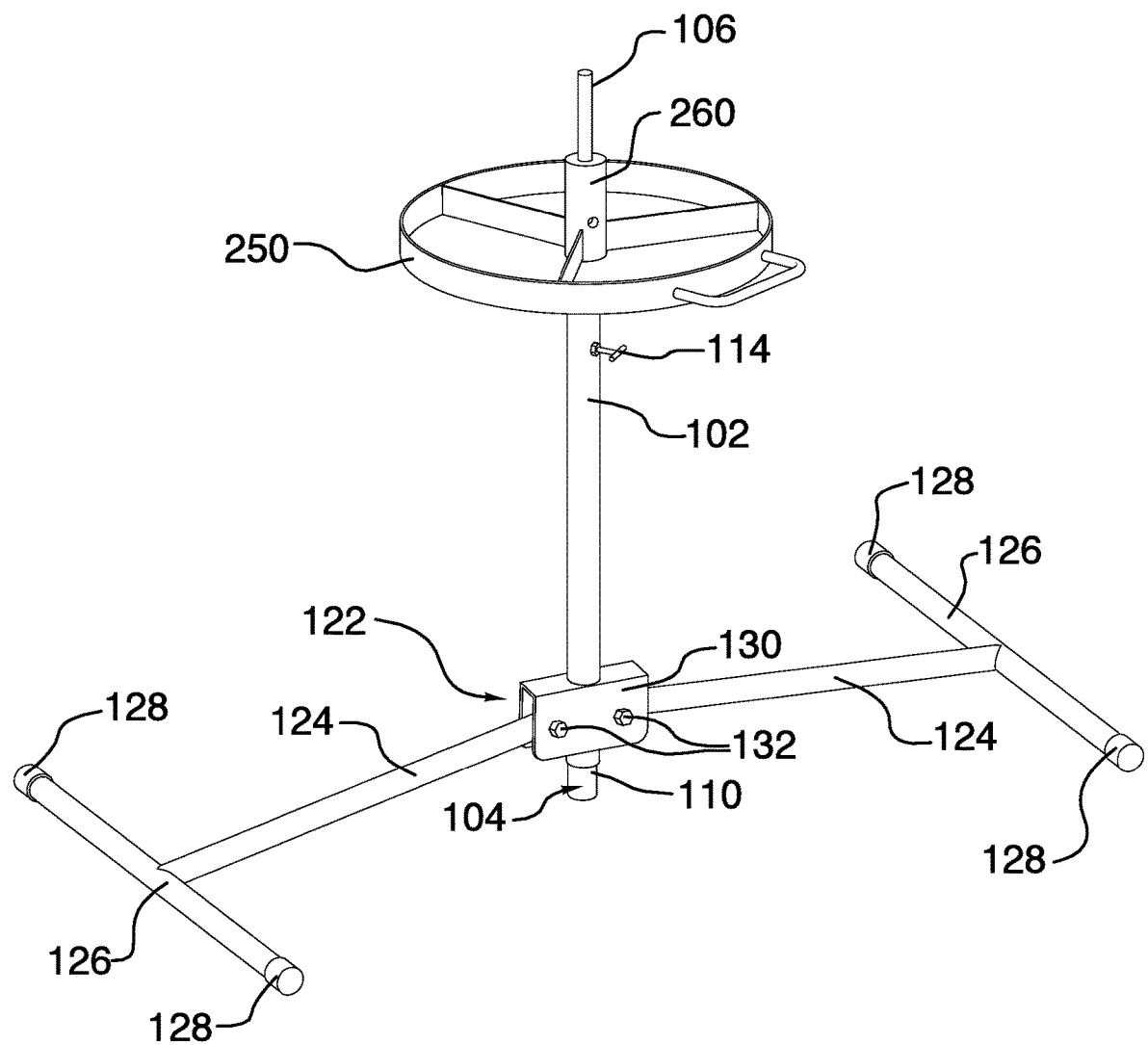
FIG. 5 is a perspective view of a bicycle stand of FIG. 1 in an expanded position with the tool tray of FIG. 2 mounted thereon.
Figure 6:
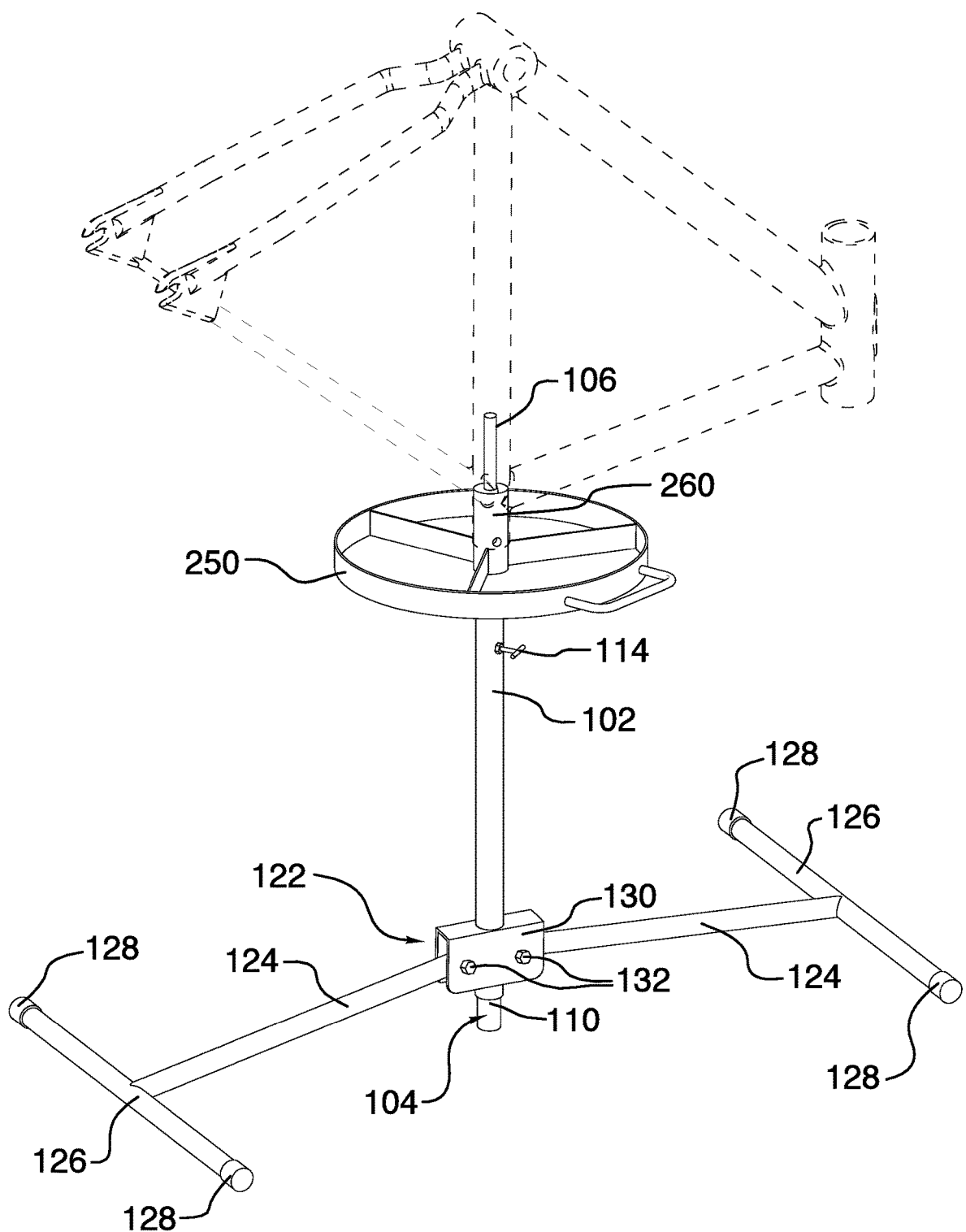
FIG. 6 is a perspective view of a bicycle stand of FIG. 5 with a bicycle frame received on the bicycle stand.

FIG. 5 shows the bicycle stand 100 with the tool tray 200 mounted thereon. This represents the normal operating configuration of the bicycle stand 100. FIG. 6 shows the bicycle stand 100 with the tool tray 200 mounted thereon and a bicycle frame received thereon. As shown in FIG. 6, the bicycle stand 100 holds a bicycle in an upside-down or inverted position. When the tool tray 200 is mounted to the bicycle stand 100, the tool tray 200 is located at a convenient height for an assembler and is readily accessible by the assembler for assembly, repair or maintenance of the bicycle. By adjusting the height of the post 101, the height of the tool tray 200 can be adjusted as well as the height of the bicycle. This allows the configuration of the bicycle stand 100 to be adjusted in accordance with the assembler. For example, when a human assembler is using the bicycle stand 100, the configuration of the bicycle stand 100 can be adjusted in accordance with the height of the individual, health and ergonomic preferences of the user, and the general comfort and working preferences of the individual. For example, when a robotic assembler is using the bicycle stand 100, the configuration of the bicycle stand 100 can be adjusted in accordance with the size, configuration and capabilities of the unit.

When the stand is not in use or when relocation of the bicycle stand 100 is described, the tool tray 200 can be removed and the bicycle stand 100 may be collapsed. To collapse the bicycle stand 100, the lock mechanism 114 for releasably securing the position of the inner post 104 is unsecured (e.g., untightened) and the inner post 104 is lowered to its lowest position to shorten the post 101. The lock mechanism 114 is then re-secured (e.g., tightened) to releasably secure the outer tube 102 to the inner post 104 and hold the post 101 in its shortest (smallest position) so that at least some (or in some embodiments more) of the inner post 104 of the post 101 pushed into the outer tube 10,2 and protrudes out of the outer tube 102. Next, the lock mechanism 122 (e.g., tensioner) for releasably securing the position of the legs 120 is set to "off" position so that the legs 120 may move freely. Next, the legs 120 are collapsed by the assembler. The legs 120 are pivoted from the expanded state in which the legs 120 are generally transverse to the post 101 to the collapsed state in which the legs 120 are substantially parallel to the post 101. In some examples, substantially parallel is less than 5 degrees from the reference position. Next, the lock mechanism 122 (e.g., tensioner) is set to the "on" position to restrict the movement of the legs 120. Alternatively, in other embodiments the legs 102 may be collapsed before the post 101 is shortened. The collapsed bicycle stand can be stored in a bag, case or similar carrying means if desired The collapsed bicycle stand is compactly folded for easier transportation or storage in narrow spaces.

Variations of the bicycle stand 100 described above are possible without departing from the scope of the present disclosure. For example, the length of the legs 120, post 101 and the position of the seat 108 on the post 101 may vary between embodiments so long as when the bicycle stand 100 is assembled and in its operating stage, the seat 108 is positioned between 30 inches and 60 inches above the ground surface. For another example, each leg 120 could be Y-shaped, or three or more legs may be provided instead of a pair of legs 120, thereby eliminating the base bars 126.

Figure 9A:
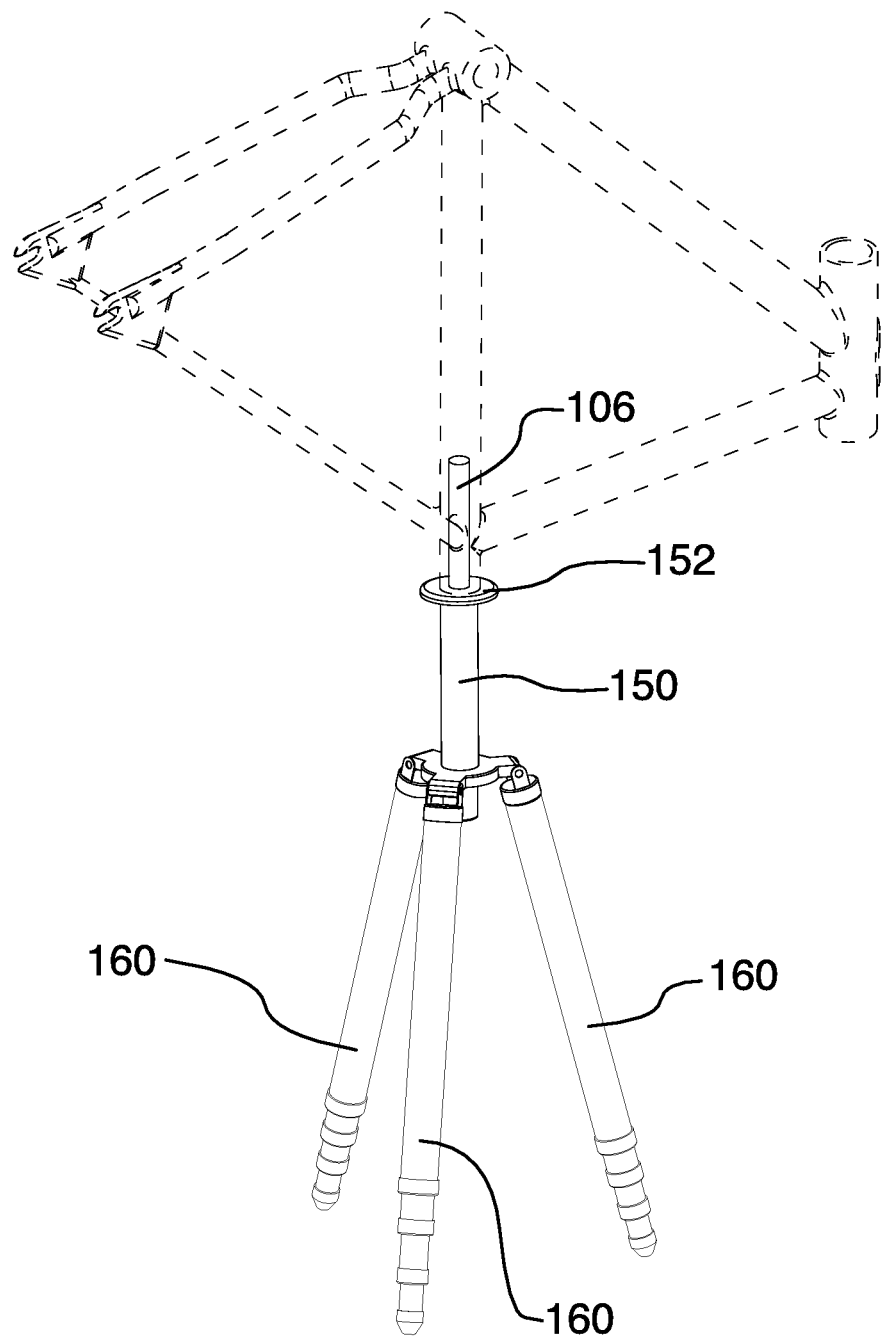
FIG. 9A is a perspective view of a bicycle stand in accordance with another embodiment of the present disclosure.
Figure 9B:
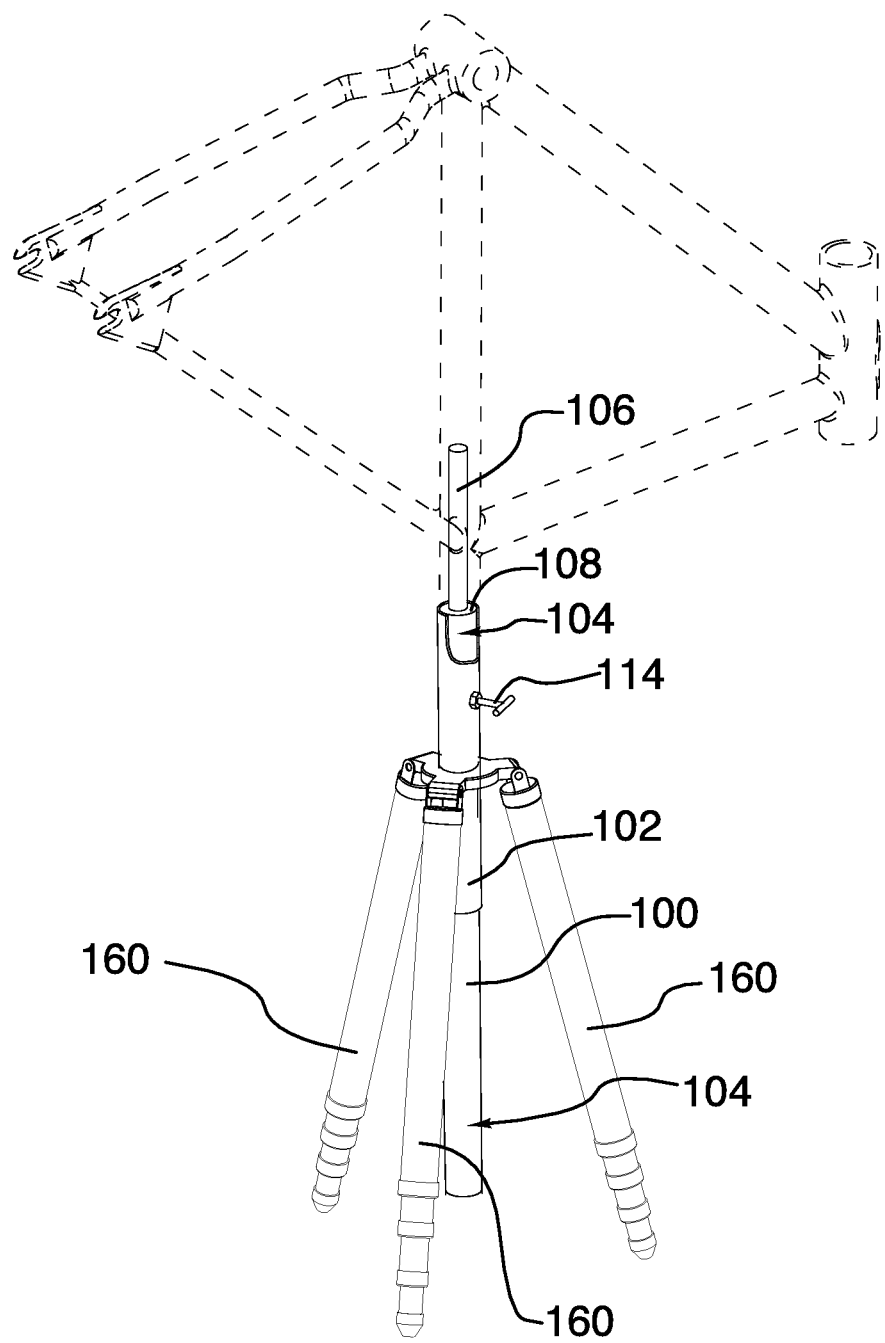
FIG. 9B is a perspective view of a bicycle stand in accordance with a further embodiment of the present disclosure.

FIGS. 9A and 9B illustrate bicycle stands in accordance with further embodiments of the present disclosure. FIGS. 9A and 9B illustrate bicycle stands in which the connecting member 130 and legs 120 of the embodiment of FIG. 1 are replaced with a tripod assembly comprising three adjustable legs 160 (e.g., telescoping legs). Each adjustable leg 160 has a plurality of shaft segments. Each of the plurality of shaft segments has a top and a bottom and each of the plurality of shaft segments, except for an end shaft segment, is capable of fitting inside an immediately adjacent shaft segment. Each adjustable leg 160 may be telescopically extended to adjust the length of the respective leg 160 from a retracted position to one of a plurality of extended positions, each extended position being defined by the position of the shaft segments of the respective leg 160. A lock mechanism for each of the shaft segments releasably secures the shaft segments in a given position relative to the immediately adjacent shaft segment into which it is capable of fitting.

The bicycle stand of FIG. 9A uses a fixed post to support the bicycle rather than a telescoping post. The post comprises two portions: a first, upper portion and a second, lower portion. The first portion is a cylindrical receiving portion 106 and a second, larger diameter cylindrical receiving portion 150 located below the cylindrical receiving portion 106. A seat 152 is provided by a flange (or collar) extending radially outward from the post. A top surface of the flange forms an annulus or ring which provides the seat 152 upon which the seat tube of the bicycle frame is supported. In some examples, the annulus has an outer diameter of between 1.5 and 1.75 inches and an inner diameter of between 0.5 and 0.75 inches. In some embodiments, the outer diameter is 1.75 and the inner diameter is 0.75 inches. The bicycle stand of FIG. 9B uses a telescoping post similar to that used in FIG. 1.

Figure 10:
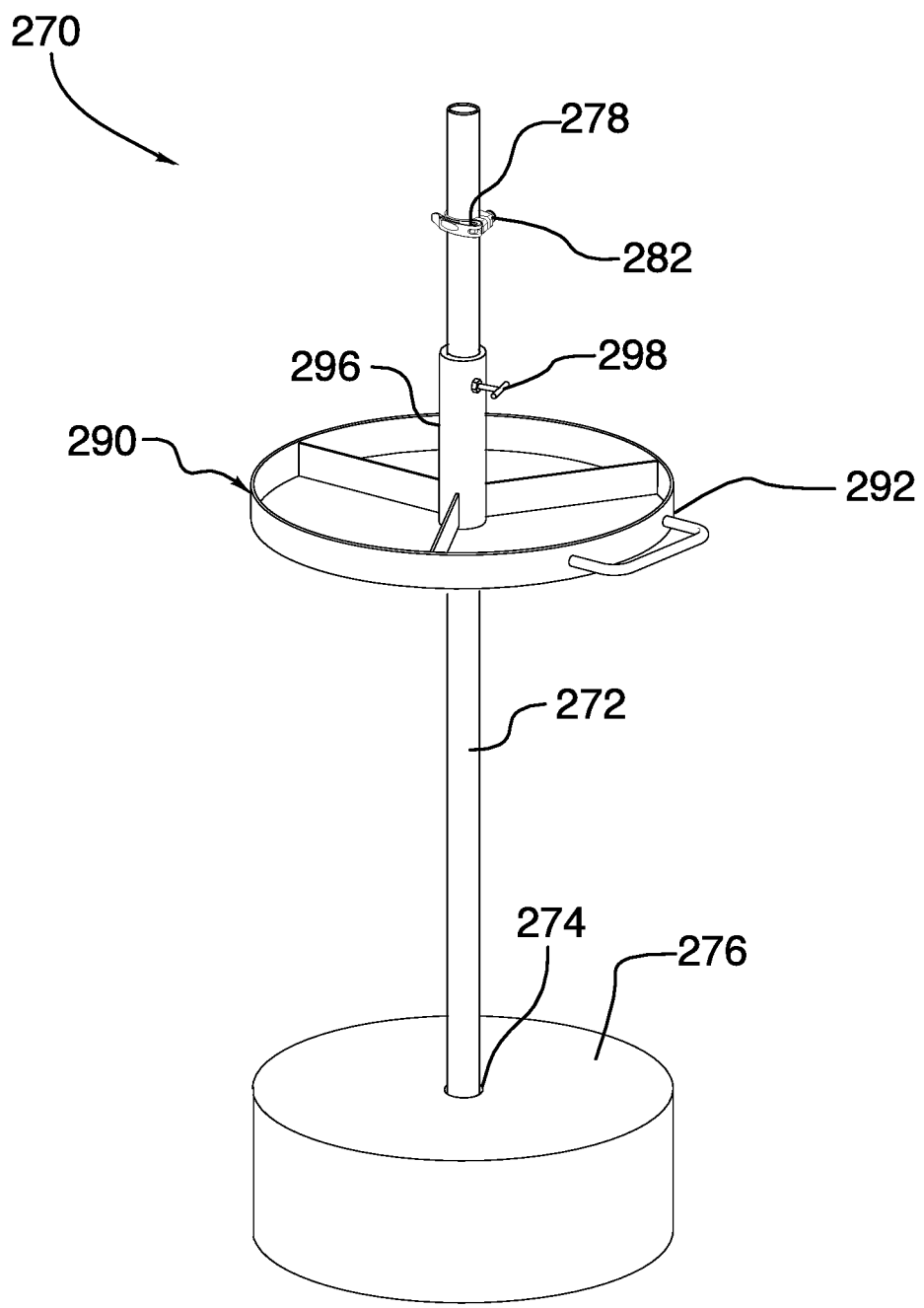
FIG. 10 is a perspective view of a bicycle stand in accordance with a further embodiment of the present disclosure.
Figure 11:
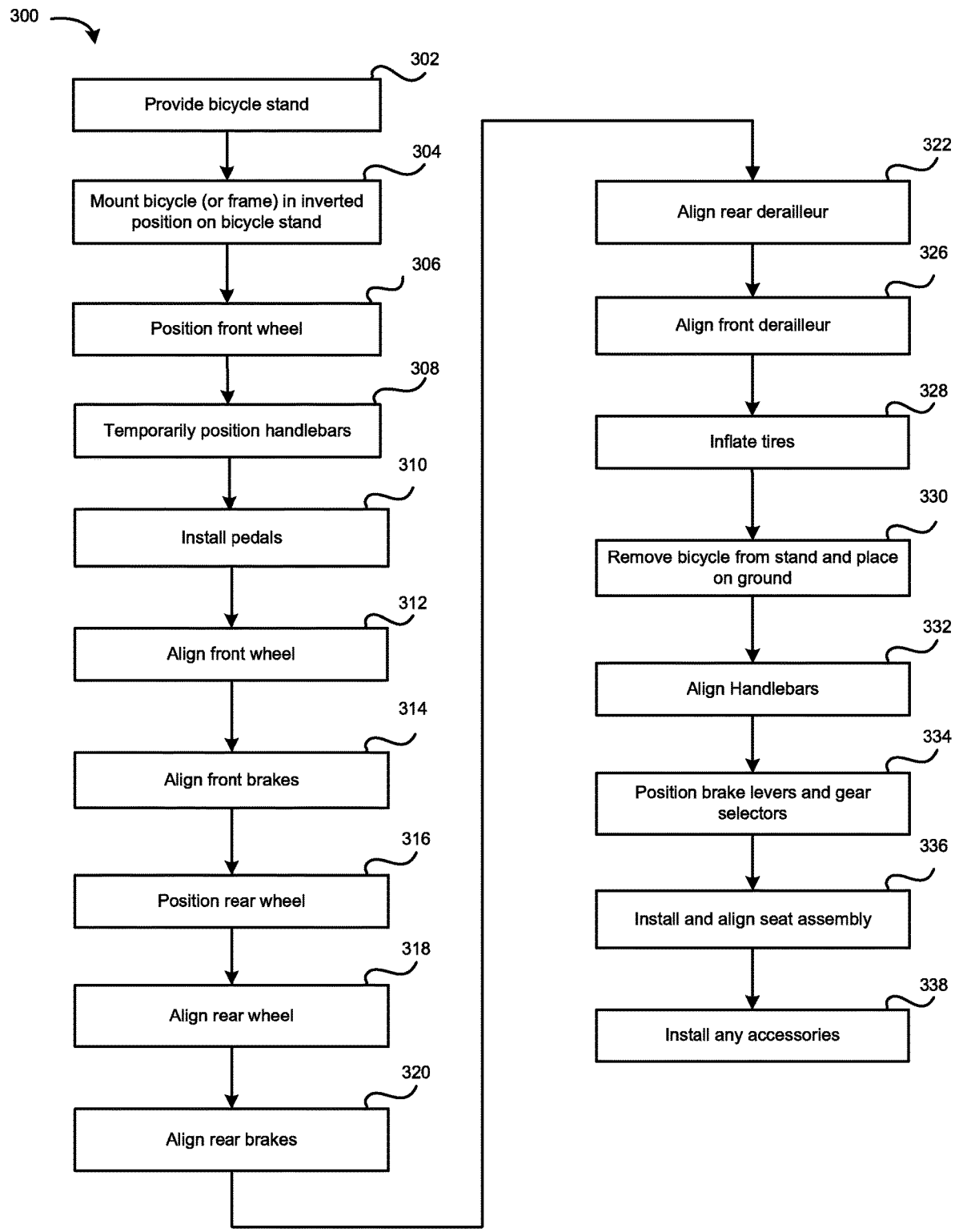
FIG. 11 is a flowchart of a method of assembling a bicycle stand in accordance with one embodiment of the present disclosure.

FIG. 10 illustrates a bicycle stand 270 in accordance with a further embodiment of the present disclosure. The bicycle stand 270 has a post 272 of fixed height that is received within a central passage 274 of a base 276. The post 272 may be removeably secured with the base 276 or fixed. The base 276 may be cylindrical. The base 276 is typically weighted so that the bicycle stand 270 is stable and can support the entire weight of a bicycle. The base 276 may define a reservoir or cavity for holding a liquid, sand or weighting material. When the base 276 includes a reservoir for a weighting material, a removable cap or lid may be provided to enclose the weighting material within the reservoir.

An adjustable clamp (or collar) 282 is releasably secured about the post 272. A top surface of the clamp 282 forms an annulus or ring which provides a seat 278 upon which the seat tube of the bicycle frame is supported. Other configurations are possible. For example, in other embodiments, the inner post from one of the embodiments of FIG. 8A, 8B or 8C may be used instead of the post 272 and clamp 282. By adjusting the height of the clamp 282, the height of the bicycle can be adjusted.

A tool tray 290 is removeably secured to the post. The tool tray 290 comprises a base 292 with a rim (or lip) extending around the periphery thereof. The tool tray 200 may be circular, rectangular, square or otherwise suitable shape. A tubular hub 296 is located at the centre of the tool tray 290. The tubular hub 296 defines a central passage through which the post 272 is received. The height of the tool tray 290 and its position on the post 272 can be adjusted by moving the tool tray 290 up and down the post 272 and engaging a lock mechanism 298 for releasably securing the tool tray 290 to the post 272. In the shown embodiment, the lock mechanism 298 is a set screw (e.g., thumb screw) which can be tightened to releasably secure the tool tray 290 to the post 272. This allows the height of the tool tray 290 to be adjusted. In other embodiments, the lock mechanism 298 may be a lock clamp or other suitable mechanism. For example, an adjustable clamp (or collar) may be releasably secured about the post 272 below the base 292 instead of the lock mechanism 298. In alternatives, a top surface of the tubular hub 296 forms an annulus or ring which provides the seat 278 upon which the seat tube of the bicycle frame is supported and the adjustable clamp 282 may be omitted.

A method 300 of assembling a bicycle using the bicycle stand in accordance with one embodiment of the present disclosure will now be described. The method may be performed by completely or at least partially with a robot (not shown) having at least one, preferably two or more, articulating arms, such as those provided by FANUC Corporation of Japan. For convenience, the method will be described as being performed by an assembler. The term assembler is not intended to be restrictive to the use of robots or in any other way. For example, the method 300 is intended to be covered by human assembly and human-assisted robotic assembly as well as robotic assembly. The bicycle is provided from a manufacturer in a partially assembly state, which may vary between manufacturers and/or between bicycle models of a given manufacturer. In a first step 302, a bicycle stand such as the bicycle stand 100 is provided.

Next, in step 304 the bicycle frame of the bicycle is positioned in an upside-down or inverted position and the seat tube of the bicycle frame is positioned on the cylindrical receiving portion 106 (e.g., dowel post) of the bicycle stand 100 via the seat tube opening. The cylindrical receiving portion 106 of the bicycle stand 100 is received in the seat tube of the bicycle frame, whereby the bicycle is securely supported by the bicycle stand 100. While supported by the bicycle stand 100, the bicycle may be freely rotated about a central axis of the post 101 at any time, thereby allowing the assembler to access the other side of the bicycle when necessary or desirable while the assembler remains stationary. This obviates the need for the assembler to move, thereby facilitating simpler, more efficient and faster assembly.

Next, in step 306 the front wheel of the bicycle is positioned on the front forks of the bicycle frame, typically via a front dropout, and the front wheel is releasably secured to the front forks via a fastener (e.g., screw, bolt or the like) by tightening the fastener to the manufacturer's torque specification. The front brake may require loosening during this process to allow for clearance of the front wheel during installation. If the front forks are not already attached, the front forks must be installed prior to this step.

Next, in step 308 the handle bars are installed on the bicycle frame in a temporary position so other adjustments required for the bicycle to function properly can be completed.

Next, in step 310 the pedals are installed on the crank of the bicycle using a pedal wrench, and the pedals are secured to the crank via fasteners (e.g., screws, bolts or the like) by tightening the fasteners to the manufacturer's torque specifications.

Next, in step 312 the front wheel is spun and inspected for any misalignments, imperfections, and the front wheel is aligned using visual references when needed to be trued from imperfections. In some embodiments, the alignment may be assisted by means of an optical inspection system comprising a sensor, such as camera, and optionally optical reference markers located on the bicycle with the optical sensor being connected or a part of a computer of optical inspection system. The computer may be a general purpose computer programmed to perform a specific set of instructions. The computer may be trained using machine learning or artificial intelligence using techniques known in the art. The computer may in turn be connected to a robotic assembler. The computer captures images of the bicycle, which may have optical reference markers located on the bicycle. The computer compares the captured images to a reference image to determine whether the front wheel is aligned. When optical reference markers are located on the bicycle, the location of the optical reference markers will be determined and used in determining whether the front wheel is aligned, thereby increasing the accuracy.

When the front wheel is not aligned, an indication may be displayed on a display screen of the computer. When the computer is connected to a robotic assembler, the computer may generate and send instructions to the robotic assembler to align the front wheel, the robotic assembler then aligning the front wheel in accordance with the received instructions. When the computer is not connected to a robotic assembler, the computer generates and displays instructions on a display screen of the computer for use by a human assembler. The process may be repeated until it is determined that the front wheel is aligned. When the front wheel is not aligned, an indication may be displayed on the display screen of the computer.

Next, in step 314 the front brakes are aligned to ideal position, ensuring safety and reliability as well as maintaining proper clearance for the front wheel to spin freely. When the front brake is a disc brake rather than a pad brake, the front disc brake is aligned using visual references when needed to be trued from imperfections. Alignment of the front brakes may be performed by an optical inspection system in a manner analogous to that described above in connection with the front wheel. If the front brakes are not already installed, the front brakes must be installed prior to this step.

Next, in step 316 the rear wheel of the bicycle is positioned on the rear of the bicycle frame, typically via a rear dropout, and the rear wheel is releasably secured to the frame via a fastener (e.g., screw, bolt or the like) by tightening the fastener to the manufacturer's torque specification. The rear brake may require loosening during this process to allow for clearance of the rear wheel during installation. Alternatively, if the rear wheel was pre-installed, this step may be omitted.

Next, in step 318 the rear wheel is spun and inspected for any misalignments, imperfections, and the rear wheel is aligned using visual references when needed to be trued from imperfections. Alignment of the rear wheel may be performed by an optical inspection system in a manner analogous to that described above in connection with the front wheel.

Next, in step 320 the rear brakes are aligned to ideal position, ensuring safety and reliability as well as maintaining proper clearance for the rear wheel to spin freely. When the rear brake is a disc brake rather than a pad brake, the rear disc brake is aligned using visual references when needed to be trued from imperfections. Alignment of the rear brakes may be performed by an optical inspection system in a manner analogous to that described above in connection with the front wheel. If the rear brakes are not already attached, the rear brakes must be installed prior to this step.

Next, in step 322 the crank is spun and the rear derailleur is set to specifications while the chain is in motion. To make adjustments to the rear derailleur, set screws and a tensioning screw at the rear of the bicycle are adjusted to ensure all gears are working correctly. Gear operation is checked by changing gears (by adjusting the position of the corresponding gear changer on the handlebar). The rear derailleur is adjusted until all gears are operating correctly, operating parameters are within operating tolerances, such as those specified by the manufacturer. Alignment of the rear derailleur may be performed by an optical inspection system in a manner analogous to that described above in connection with the front wheel. Gears are optionally positioned at their bottom position to preserve the cables by elevating the cables and thereby limiting contact with the ground surface.

Next, in step 326 the crank is spun and the front derailleur is set to specifications while the chain is in motion. To make adjustments to the front derailleur, the front gear cable is adjusted by resetting the cable position. Gear operation is checked by changing gears (by adjusting the position of the corresponding gear changer on the handlebar). The front derailleur is adjusted until all gears are operating correctly, and operating parameters are within operating tolerances, such as those specified by the manufacturer. Alignment of the front derailleur may be performed by an optical inspection system in a manner analogous to that described above in connection with the front wheel. Gears are optionally positioned at their bottom position to preserve the cables by elevating the cables and thereby limiting contact with the ground surface.

Next, in step 328 inflate the tires to the proper specifications and check again to see that they are both moving freely and check for imperfections.

Next, in step 330 the partially assembled bicycle is lifted and removed from the bicycle stand 100 and positioned in an upright position on the ground.

Next, in step 332 the handlebars are aligned with the bicycle frame and tightened to manufacturer's specifications. This includes proper alignment of the handlebars to the front wheel. Alignment of the handlebars may be performed by an optical inspection system in a manner analogous to that described above in connection with the front wheel.

Next, in step 334 the brake levers and gear selectors are positioned in an operable or comfortable position, and tightened.

Next, in step 336 the seat assembly is installed by inserting the seat post into the opening of the seat tube, aligned the seat with the bicycle frame and tightening a clamp or bolt of the bicycle frame to manufacturer's specifications to releasably secure the seat post of the seat assembly to the bicycle frame, typically with the seat post in the lowest position atop the seat tube. Alignment of the seat assembly may be performed by an optical inspection system in a manner analogous to that described above in connection with the front wheel.

Lastly, in step 338 any reflectors and accessories, such as a kickstand, bell or horn, headlight, taillight, basket, etc. are installed on the bicycle.

The steps and/or operations in the flowchart and method described herein are for purposes of example only. There may be many variations to these steps and/or operations without departing from the teachings of the present disclosure. For instance, some of the steps may be performed in a differing order, or steps may be added, deleted, or modified.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the preferred embodiments set forth in the examples, but should be given the broadest interpretation consistent with the description as a whole.

The invention claimed is:

1. A bicycle stand, comprising:
   a base for contacting a ground surface; and
   a support member having an upper portion and a lower portion, the support member being held by the base so as to be substantially vertical, the support member including:
      a cylindrical receiving portion located at the upper portion of the support member and adapted for engaging an interior of a seat tube of a bicycle frame while the bicycle frame is in an upside-down or inverted position, the cylindrical receiving portion having a diameter greater than 0.5 inches and less than 0.75 inches; and
      a seat located directly below the cylindrical receiving portion, the seat having a cross-sectional area larger than the cross-sectional area of the cylindrical receiving portion, the seat providing a support surface adapted for directly supporting the seat tube of the bicycle frame so that the bicycle frame is freely rotatable about a central axis of the support member while the bicycle frame is supported on the seat with the bicycle frame in the upside-down or inverted position, wherein the seat is positioned between 30 inches and 60 inches above the ground surface,
      wherein the support member comprises a first portion and a second portion, the first portion being the cylindrical receiving portion, the second portion being located below the cylindrical receiving portion and having a larger cross-sectional area, wherein the seat is provided by a top of the second portion.

2. The bicycle stand of claim 1, wherein the support member is telescoping to provide an adjustable length.

3. The bicycle stand of claim 2, wherein the support member is received in an outer tube, the support member being movable within the outer tube, wherein the support member comprises a lock mechanism for releasably securing the position of the support member relative to the outer tube.

4. The bicycle stand of claim 3, wherein the lock mechanism is a lock clamp or a set screw.

5. The bicycle stand of claim 1, further comprising:
   a removable tool tray removably mounted to the support member so that the tool tray is accessible by an assembler while the bicycle frame is received on the bicycle stand.

6. The bicycle stand of claim 5, wherein the tool tray comprises a tray base having a rim extending around the periphery thereof, and a tubular hub at the centre of the tray base, wherein the tubular hub defines a central passage through which the cylindrical receiving portion of the support member is received and a tray seat surrounding the central passage upon which the tool tray rests, wherein the seat of the support member supports the tool tray via the tray seat of the tool tray.

7. The bicycle stand of claim 1, wherein the base comprises a pair of legs rotatably connected to a connecting member.

8. The bicycle stand of claim 7, wherein the pair of legs are rotatably connected to the connecting member, wherein the bicycle stand further comprises a lock mechanism for releasably securing a position of the legs.

9. The bicycle stand of claim 1, wherein the seat is positioned between 34 inches and 38 inches above the ground surface with which the base is in contact.

10. The bicycle stand of claim 9, wherein the seat is positioned between 35 and 37 inches above the ground surface with which the base is in contact.

11. The bicycle stand of claim 1, the cylindrical receiving portion has a diameter of between 0.70 and 0.74 inches.

12. A kit for a bicycle stand, comprising:
    a support member having an upper portion and a lower portion, the support member including:
       a cylindrical receiving portion located at the upper portion of the support member and adapted for engaging an interior of a seat tube of a bicycle frame while the bicycle frame is in an upside-down or inverted position, the cylindrical receiving portion having a diameter of greater than 0.5 inches and less than 0.75 inches; and
       a seat located directly below the cylindrical receiving portion, the seat having a cross-sectional area larger than the cross-sectional area of the cylindrical receiving portion, the seat providing a support surface adapted for supporting the seat tube of the bicycle frame so that the bicycle frame is freely rotatable about a central axis of the support member while the bicycle frame is supported on the seat with the bicycle frame in the upside-down or inverted position;
    a base for contacting a ground surface, wherein the base is adapted to hold the support member substantially vertical, wherein the seat is positioned between 30 inches and 60 inches above the ground surface when the support member is being held by the base,
    wherein the support member comprises two portions, a first of the two portions being the cylindrical receiving portion and a second of the two portions being located below the cylindrical receiving portion and having a larger cross-sectional area, wherein the seat is provided by an upper end of the second portion.

13. The kit of claim 12, wherein the support member is telescoping to provide an adjustable length.

14. The kit of claim 13, wherein the support member is received in an outer tube, the support member being movable within the outer tube, wherein the support member comprises a lock mechanism for releasably securing the position of the support member relative to the outer tube.

15. The kit of claim 14, wherein the lock mechanism is a lock clamp or a set screw.

16. The kit of claim 12, further comprising:
    a removable tool tray for removably mounting to the support member so that the tool tray is accessible by an assembler while the bicycle frame is received on the bicycle stand.

17. The kit of claim 16, wherein the tool tray comprises a tray base having a rim extending around the periphery thereof, and a tubular hub at the centre of the tray base, wherein the tubular hub defines a central passage through which the cylindrical receiving portion of the support member is received and a tray seat surrounding the central passage upon which the tool tray rests, wherein the seat of the support member supports the tool tray via the tray seat of the tool tray.

18. The kit of claim 12, wherein the base comprises a pair of legs rotatably connected to a connecting member.

19. The kit of claim 18, wherein the pair of legs are rotatably connected to the connecting member, wherein the bicycle stand further comprises a lock mechanism for releasably securing a position of the legs.

20. The kit of claim 12, wherein the seat is positioned between 34 inches and 38 inches above the ground surface with which the base is in contact.

21. The kit of claim 20, wherein the seat is positioned between 35 and 37 inches above the ground surface with which the base is in contact.

22. The kit of claim 12, the cylindrical receiving portion has a diameter of between 0.70 and 0.74 inches.

* * * * *